(12) United States Patent
Frantz et al.

(10) Patent No.: US 7,798,447 B2
(45) Date of Patent: Sep. 21, 2010

(54) NON-PROTRUDING SEAT TRACK APPARATUS AND METHODS

(75) Inventors: Walter Forrest Frantz, North Bend, WA (US); Martin R. Grether, Bothell, WA (US); Cory M. Hitchcock, Granite Falls, WA (US); Gina C. Pischke, Lynnwood, WA (US); Todd Evan Jones, Lake Stevens, WA (US); Paul R. Fortado, Everett, WA (US)

(73) Assignee: The Boeing Company, Chicago, IL (US)

( * ) Notice: Subject to any disclaimer, the term of this patent is extended or adjusted under 35 U.S.C. 154(b) by 52 days.

(21) Appl. No.: 12/409,483

(22) Filed: Mar. 23, 2009

(65) Prior Publication Data

US 2009/0236471 A1    Sep. 24, 2009

Related U.S. Application Data

(62) Division of application No. 10/811,528, filed on Mar. 29, 2004, now Pat. No. 7,506,855.

(51) Int. Cl.
*B64C 1/20* (2006.01)
*F16M 13/00* (2006.01)

(52) U.S. Cl. .................... 244/118.6; 248/503.1; 410/90
(58) Field of Classification Search ............. 244/118.6, 244/122 R, 129.1, 131, 118.1; 410/101, 410/104, 105, 90; 52/10; 248/424, 419, 248/429, 503.1
See application file for complete search history.

(56) References Cited

U.S. PATENT DOCUMENTS

| 7,506,855 B2 * | 3/2009 | Frantz et al. ............. 248/424 |
| 2009/0014584 A1 * | 1/2009 | Rudduck et al. ......... 244/118.6 |

\* cited by examiner

*Primary Examiner*—Timothy D Collins

(57) ABSTRACT

Non-protruding seat track apparatus and methods are disclosed. In one embodiment, a track includes an elongated support having a support surface and an engagement surface. The support surface is adapted to engage a lower surface of a floor panel, and the engagement surface is adapted to be coupled to a payload assembly. The engagement surface is at least one of flush with and recessed below the lower surface of the floor panel when the support surface is engaged with the lower surface. The engagement surface may have at least one of an engagement slot and an attachment aperture disposed therein.

20 Claims, 5 Drawing Sheets

NON-PROTRUDING SEAT TRACK APPARATUS AND METHODS

This is a divisional of U.S. Ser. No. 10/811,528 filed Mar. 29, 2004 now U.S. Pat. No. 7,506,855.

CROSS REFERENCE TO RELATED APPLICATIONS

This patent application is related to the following co-pending, commonly-owned U.S. patent applications filed concurrently herewith on Mar. 29, 2004, which applications are hereby incorporated by reference: U.S. patent application Ser. No. 10/811,529 entitled "Adaptable Payload Apparatus and Methods"; U.S. patent application Ser. No. 10/811,771 entitled "Adaptable Payload Processes"; U.S. patent application Ser. No. 10/811,522 entitled "Payload to Support Track Interface and Fitting Apparatus and Methods"; and U.S. patent application Ser. No. 10/811,787 entitled "Adaptable Payload Enabling Architecture".

FIELD OF THE INVENTION

This invention relates generally to apparatus and methods for coupling seats and other payloads to a floor assembly or other support structure, and more specifically, to non-protruding seat track apparatus and methods.

BACKGROUND OF THE INVENTION

Many aspects of modern commercial aircraft are manufactured in accordance with the particular requirements of the aircraft owner. One such aspect is the arrangement of the passenger seats and other payloads (e.g. partitions, galleys, lavatories, and other aircraft components) within the cabin of the aircraft.

For example, FIG. 1 is an isometric view of a seat assembly 100 in accordance with the prior art. The seat assembly 100 includes one or more seat members 102 coupled to a pair of support members 104. A floor assembly 108 that supports the seat members 102 includes a pair of seat tracks 106 and a plurality of floor panels 112 disposed on opposing sides of the seat tracks 106. Attachment assemblies 110 attach the support members 104 to the seat tracks 106 of the floor assembly 108. As best shown in the cross-sectional view of FIG. 2, the upper surfaces of the floor panels 112 are approximately flush with an engagement member 114 of the seat track 106, thereby providing a suitable floor surface for the passengers. Seat assemblies of the type shown in FIG. 1 are disclosed, for example, in U.S. Pat. No. 6,619,588 B2 issued to Lambiaso, U.S. Pat. No. 6,601,798 B2 issued to Cawley, U.S. Pat. No. 6,260,813 B1 issued to Whitcomb, and U.S. Pat. No. 5,337,979 issued to Bales et al.

FIG. 3 is an example of a perspective view of the seat track 106 of FIGS. 1 and 2. As shown in FIG. 3, the engagement member 114 of the seat track 106 is coupled to a structural member 116. Upper surfaces 118 of the structural member 116 engage and support the floor panels 112 (FIG. 2) adjacent the engagement member 114. A plurality of attachment devices 119 (FIG. 2) couple the floor panels 112 to the structural member 116. As further shown in FIGS. 2 and 3, a slot (or recess) 120 is disposed within the engagement member 114. The slot 120 forms a plurality of alternating holes 122 and lands 124 that are adapted to cooperatively engage the attachment assembly 110. In operation, the attachment assembly 110 is engaged into one of the holes 122, and is slideably moved along the slot 120 to a desired location, at which point the attachment assembly 110 is secured to one of the lands 122. Thus, the slot 120 permits the seat member 102 to be selectively positioned at any desired location along the seat track 106. Thus, the seat assembly 100 allows the aircraft owner to control the spacing of the seat members 102 within the aircraft.

Although desirable results have been achieved using the prior art seat assembly 100, there is room for improvement. In some aircraft configurations, for example, there may be portions of the passenger cabin that do not require passenger seats, and therefore, there may be no need for the seat tracks 106. Using the prior art floor assembly 108, however, the seat tracks 106 remained exposed and visible even though they are not needed. Furthermore, because the floor panels 112 "break" on opposing sides of the engagement member 114 of the seat track 106, the labor and expense associated with sealing and securing the edges of the floor panels 112 to the channel members 116 must be incurred even though there is no need to install seat members 102 on the seat tracks 106. Also, wire systems running in proximity to and parallel with the seat tracks 106 must be undesirably positioned on top of the floor panels 112. Therefore, novel floor assemblies which at least partially mitigate these characteristics would be useful.

SUMMARY OF THE INVENTION

In one embodiment, an aircraft comprises a fuselage including a floor assembly. The floor assembly includes a floor panel and an elongated support having a support surface engaged with a lower surface of the floor panel. The elongated support further has an engagement surface that is either flush with or recessed below the lower surface of the floor panel. The engagement surface is adapted to engage an aircraft component.

BRIEF DESCRIPTION OF THE DRAWINGS

The preferred and alternative embodiments of the present invention are described in detail below with reference to the following drawings.

DETAILED DESCRIPTION

The present invention relates to apparatus and methods for coupling seats to a floor assembly or other support structure, and more specifically, to non-protruding seat track apparatus and methods. Many specific details of certain embodiments of the invention are set forth in the following description and in FIGS. 1-10 to provide a thorough understanding of such embodiments. One skilled in the art, however, will understand that the present invention may have additional embodiments, or that the present invention may be practiced without several of the details described in the following description.

Generally speaking, embodiments of apparatus and methods in accordance with the present invention include floor assemblies having a non-protruding seat track. More specifically, in accordance with the present invention, an upper surface of the seat track in which one or more engagement apertures are disposed for attaching a seat assembly is positioned flush with (or recessed below) the upper surfaces of the adjacent support members (e.g. "C"-shaped channel members). The terms "flush" and "flush with" as used in this patent application are defined more fully below. Because the upper surface of the seat track does not significantly protrude above the adjacent support members, there is no need for the floor panels of the floor assembly to "break" at the seat track. For aircraft configurations having a section of the passenger cabin that does not include passenger seating or other aircraft components (e.g. galleys, cargo containers, partitions, etc.) which may be coupled to the seat tracks, appropriate floor panels may be installed which extend continuously over the non-protruding seat tracks. Also, wire systems running parallel with the seat tracks need not be positioned on top of the floor panels.

Figure 1:
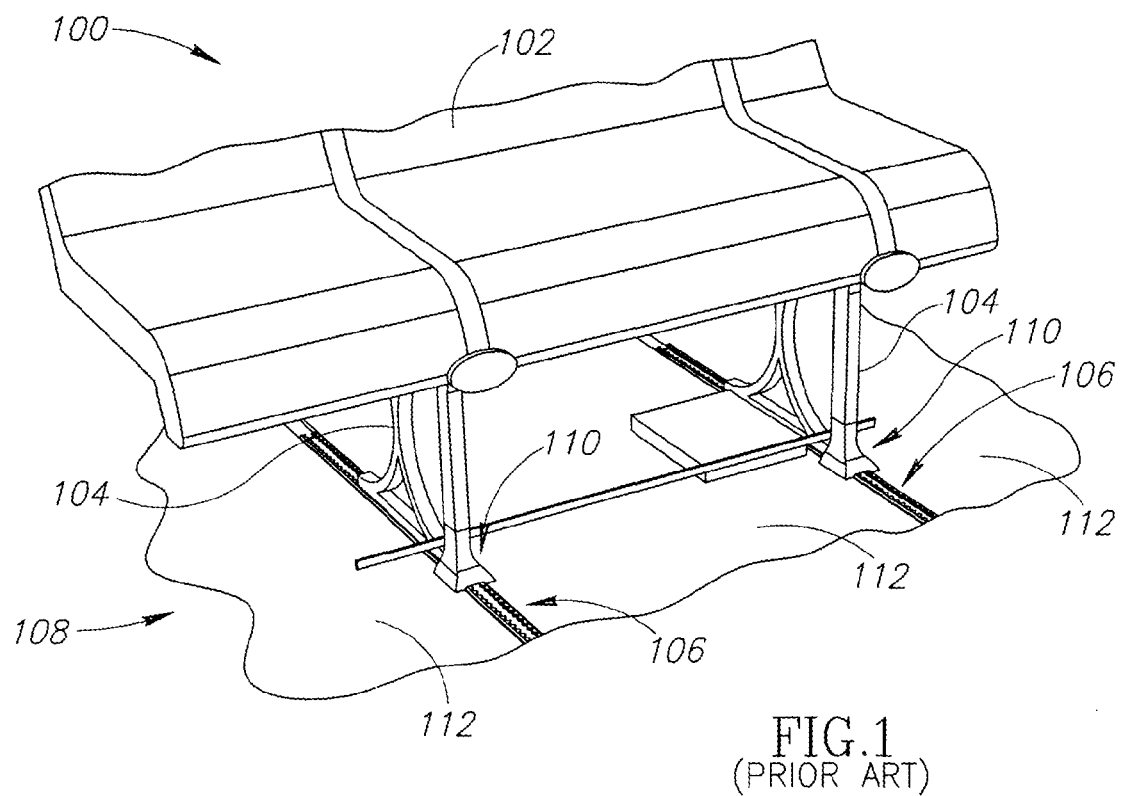
FIG. 1 is an isometric view of a seat assembly in accordance with the prior art.
Figure 2:
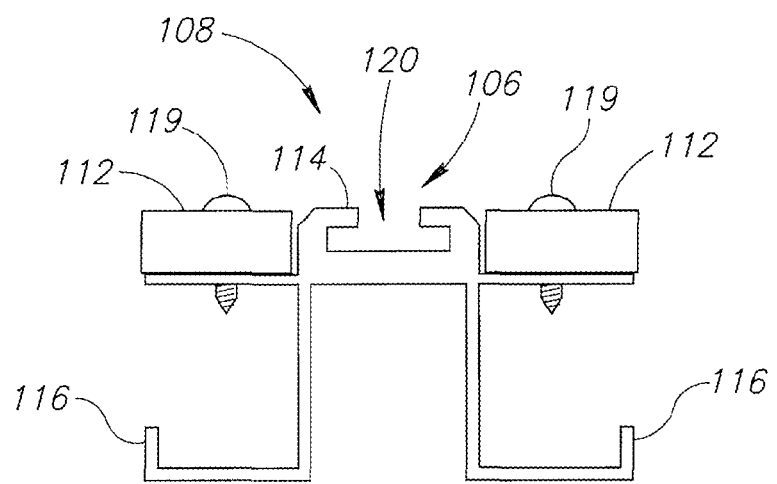
FIG. 2 is an enlarged cross-sectional view of a floor assembly of FIG. 1.
Figure 3:
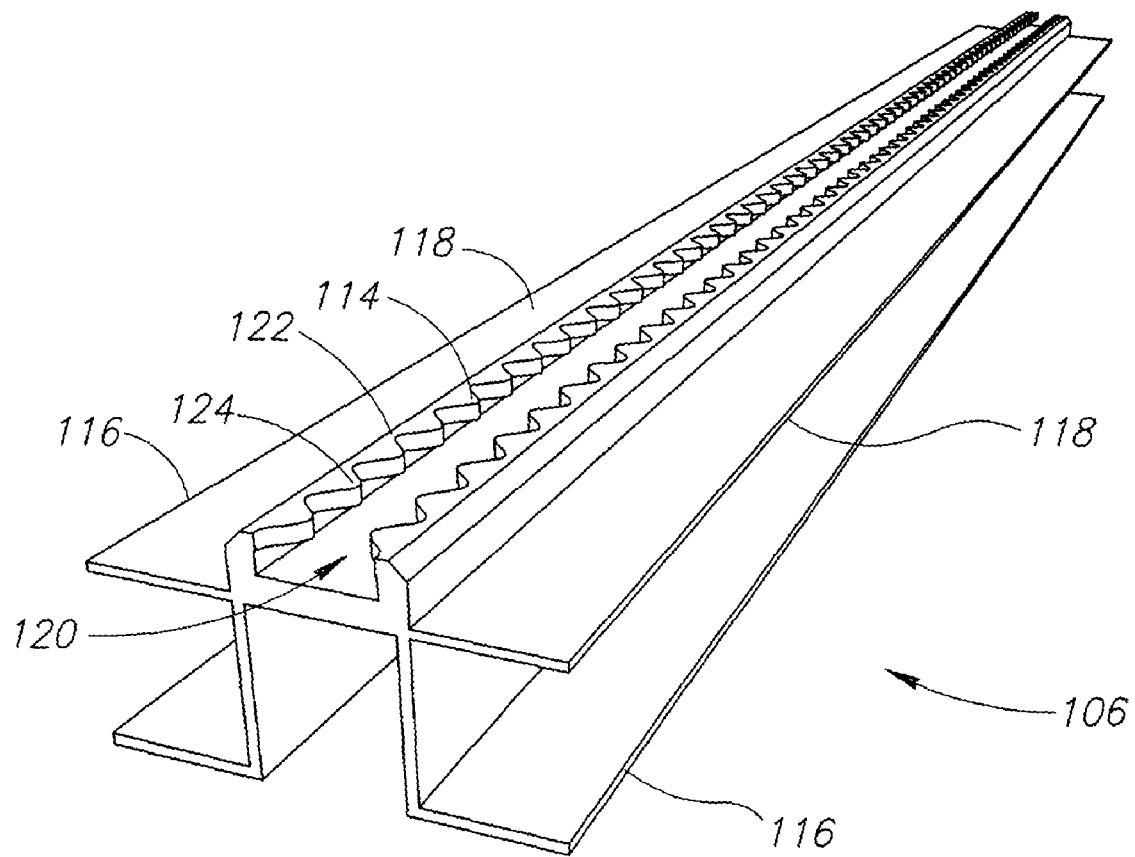
FIG. 3 is a perspective view of a seat track of FIGS. 1 and 2.
Figure 4:
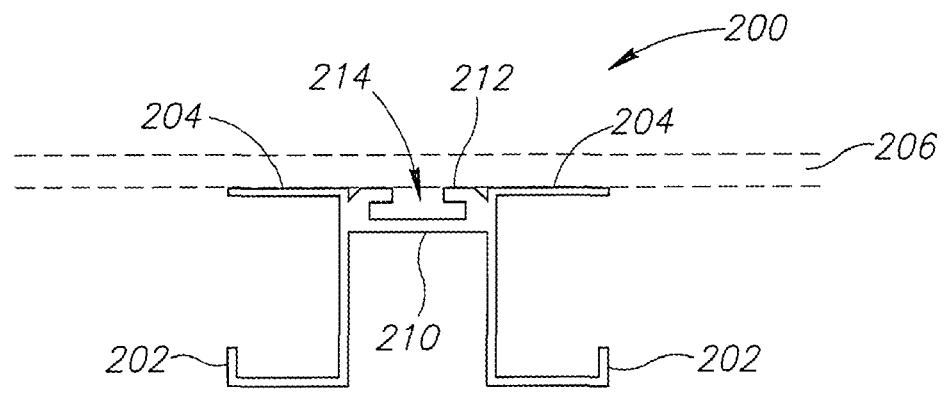
FIG. 4 is an end elevational view of a non-protruding seat track in accordance with an embodiment of the present invention.

FIG. 4 is an end elevational view of a non-protruding seat track 200 in accordance with an embodiment of the present invention. In this embodiment, the seat track 200 includes a pair of "C"-shaped channel members 202 each having an upper surface 204 for engaging and supporting a floor panel 206 (shown in dashed lines). It will be appreciated that the upper surfaces 204 may engage the lower surface of the floor panel 206 directly or indirectly, as a variety of materials or components may be disposed between the upper surfaces 204 and the lower surface of the floor panel 206, including, for example, an insert spacer, a clip-nut, cork, tape, or other materials or components.

As further shown in FIG. 4, an engagement member 210 is coupled to the channel members 202. In this embodiment, the engagement member 210 includes an engagement surface 212 that is positioned approximately co-planar with the upper surfaces 204 of the adjacent channel members 202. In alternate embodiments, the engagement surface 212 may be "flush" (as defined below) with the upper surfaces 204. An engagement slot 214 is disposed in the engagement surface 212. The engagement slot 214 is adapted to engage one or more attachment assemblies for securing passenger seats or other aircraft components to the seat track 200.

It will be appreciated that the terms "flush" and "flush with" as used in this patent application when referring to the relationship between a surface that is adapted to be coupled to a payload (e.g. the engagement surface 212 of the engagement member 210) and one or more adjacent surfaces that engage a lower surface of a floor panel (e.g. the upper surfaces 204 of the adjacent channel members 202) should be construed as including "approximately flush" or "nearly flush," and should not be construed as being limited to a precisely co-planar condition. Moreover, as used in this context, the terms "flush" and "flush with" should be understood to include a condition of not significantly protruding above the adjacent surfaces that engage the lower surface of the floor panel. Thus, as used in this patent application, when the engagement surface is said to be "flush" with the adjacent support surfaces, the engagement surface and the adjacent support surfaces need not be precisely co-planar, but rather, may be non-planar to a limited degree as long as a floor panel may extend continuously thereover without creating a tripping hazard or other unacceptable condition. Practically speaking, in some embodiments, the term "flush" may include an engagement surface that is up to about 0.2 inches higher than an adjacent support surface. In other embodiments, the term "flush" may include an engagement surface that is up to about 0.17 inches higher than an adjacent support surface as determined by an amount a floor panel is allowed to bend over uneven surfaces. In still other embodiments, the term "flush" may include an engagement surface that is up to about 0.04 inches lower than an adjacent support surface. In further embodiments, a greater amount of non-planarity may be acceptable within the meaning of the term "flush" as used herein.

In operation, the seat track 200 may be used as described above with respect to FIGS. 1-3 to support passenger seats or other aircraft components. Alternately, however, for sections of the passenger cabin which do not have passenger seating, the non-protruding seat track 200 may be used in a flooring assembly 210 to support a floor panel 206. Because the engagement surface 212 of the seat track 200 does not significantly protrude above the upper surfaces 204 of the adjacent channel members 202, the floor panel 206 is not required to break at the location of the seat track 200, and may extend continuously across the seat track 200.

Embodiments of apparatus and methods in accordance with the present invention may provide significant advantages over the prior art. For example, because the engagement surface does not significantly protrude above the adjacent support surfaces of the channel members (or alternately, because the engagement surface is flush with the lower surface of the floor panel rather than the upper surface of the floor panel), the floor panel may extend continuously over the non-protruding seat track. Thus, the labor and expense associated with installation of the floor panels may be reduced. More specifically, because there is no need to secure two floor panel edges to the seat track, the labor and expense associated with drilling the channel members, hole touch up, installation of clip nuts, clip nut touch up, floor panel drilling, floor panel inserts, insert installation, fasteners, and faster installation may be greatly reduced in comparison with the prior art. Also, because there is no need to seal two floor panel edges to the seat track, the labor and expense associated with the installation of filler, the treatment of the channel members, caulking of the interface between the floor panel in the seat track, caulking flush treatment, sealing tape, and the application of the sealing tape, may also be greatly reduced. Furthermore, because the engagement surface of the seat track is disposed below the floor panels, the aesthetic quality of the passenger cabin may be improved.

Embodiments of apparatus and methods in accordance with the present invention may be used to secure a variety of aircraft components to the flooring assembly, including passenger seating, galleys, lavatories, fireplaces, shelving, beds, other articles of furniture, and any other desired components. In addition, embodiment of seat tracks in accordance with the invention may be used to secure dividing devices (or partitions) within the passenger cabin, as generally disclosed, for example, in U.S. Pat. No. 5,393,013 issued to Schneider et al., and to secure cargo containers as generally disclosed, for example, in U.S. Pat. No. 5,090,639 issued to Miller et al.

It may be appreciated that a variety of alternate embodiments in accordance with the invention may be conceived, and that the invention is not limited to the particular embodiment described above and shown in FIG. 4. In the following discussion, various alternate embodiments of the invention will be described. For the sake of brevity, however, only significant differences in the structure and operation of these alternate embodiments will be described in detail. Where possible, similar components will be referenced using similar reference numbers.

Figure 5:
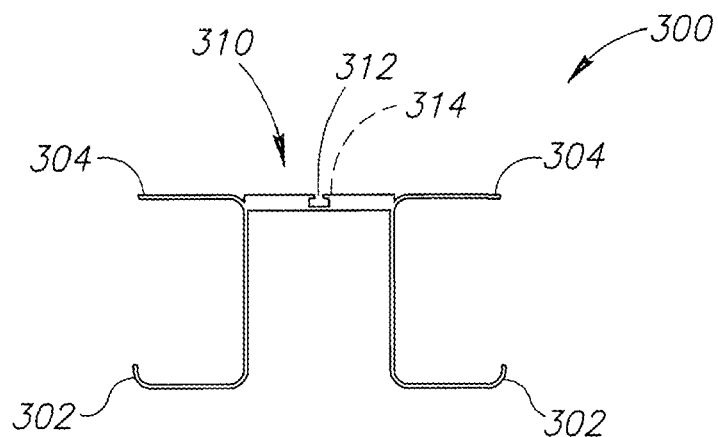
FIGS. 5-9 are end elevational views of non-protruding seat tracks in accordance with alternate embodiments of the invention.

FIG. 5 is an end elevational view of a non-protruding seat track 300 in accordance with an alternate embodiment of the invention. In this embodiment, the seat track 300 includes a pair of channel members 302 having an upper surface 304 that engages and supports a floor panel (not shown). An engagement plate 310 is attached to and extends between the channel members 302 such that an engagement surface 312 of the engagement plate 310 is flush with (or recessed below) the adjacent upper surfaces 304 of the channel members 302. One or more attachment apertures 314 (not visible) may be disposed within the engagement plate 310, thereby enabling attachment assemblies to be coupled to the engagement plate 310 for securing passenger seats or other aircraft components to the seat track 300. The seat track 300 may provide the above-noted advantages of reduced labor and expense, and may also provide reduced weight in comparison with alternate embodiments.

Figure 6:
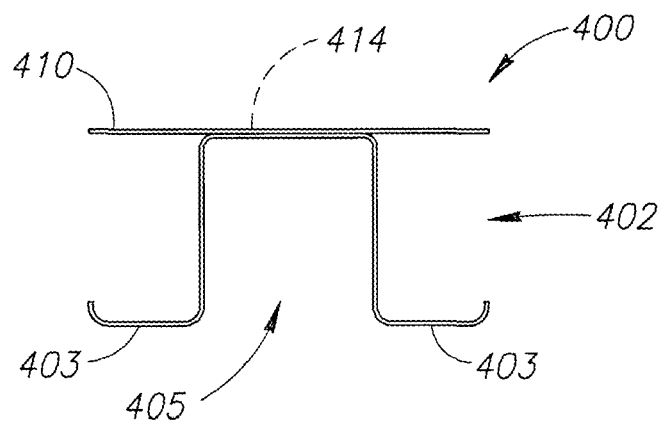

FIG. 6 is an end elevational view of a non-protruding seat track 400 in accordance with another embodiment of the invention. In this embodiment, the non-protruding seat track 400 includes a channel member 402 and an engagement plate 410. The channel member 402 includes a pair of outwardly-extending flange portions 403, and a raised plateau (or top hat) portion 405 centrally disposed between the flange portions 403. The engagement plate 410 is coupled to and extends outwardly beyond the raised plateau portion 405. Attachment apertures 414 (not visible) may be disposed within the engagement plate 410, and also within the raised plateau portion 405, for securing passenger seats or other aircraft components to the seat track 400.

Figure 7:
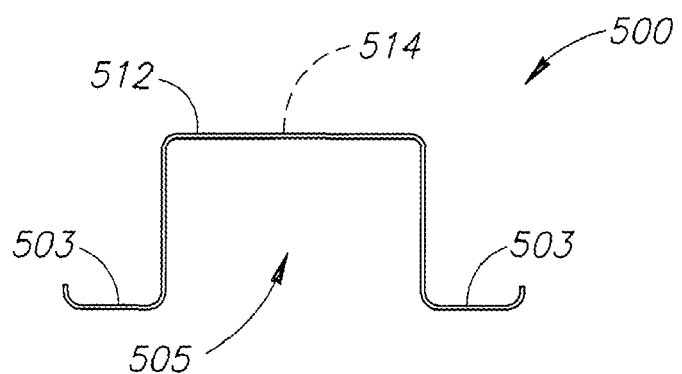

FIG. 7 is an end elevational view of a non-protruding seat track 500 in accordance with another alternate embodiment of the invention. In this embodiment, the seat track 500 includes a pair of outwardly-extending flange portions 503 and a raised plateau (or top hat) portion 505 centrally disposed between the flange portions 503. The raised plateau portion 505 includes an engagement surface 512 that engages and supports a floor panel (not shown). Attachment apertures 514, including slots, holes, etc. may be disposed through the engagement surface 512 for securing passenger seats or other aircraft components to the seat track 500.

Figure 8:
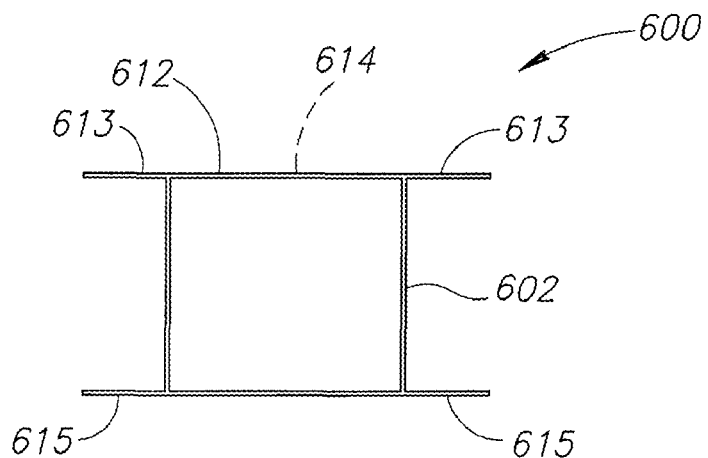

FIG. 8 is an end elevational view of a non-protruding seat track 600 in accordance with yet another embodiment of the invention. In this embodiment, the seat track 600 includes a box-beam member 602 having an engagement surface 612, and a pair of outwardly-extending engagement flanges 613 disposed on opposing sides of the engagement surface 612. Attachment apertures 614, including slots, holes, etc. may be disposed through the engagement surface 612. Structural or auxiliary flanges 615 project outwardly from the box-beam member 602, and may be used to provide additional beam stiffening or to support, for example, wiring bundles, plumbing, fiber optics, or other aircraft components.

Figure 9:
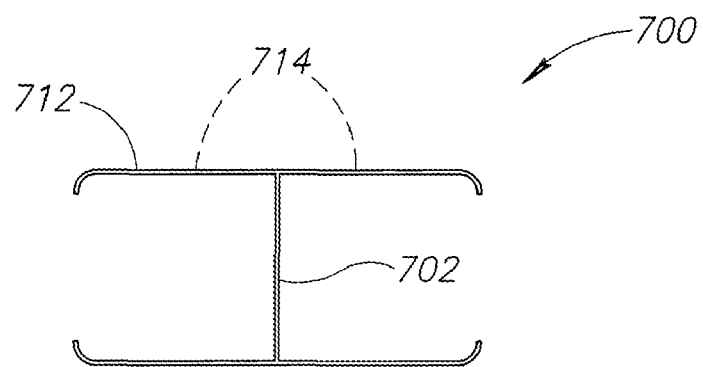

FIG. 9 is an end elevational view of a non-protruding seat track 700 in accordance with a further embodiment of the invention. In this embodiment, the seat track 700 includes and "I"-shaped beam 702 having an upper engagement surface 712 that engages and supports a floor panel (not shown). Attachment apertures 714 may be disposed in the upper engagement surface 712.

Figure 10:
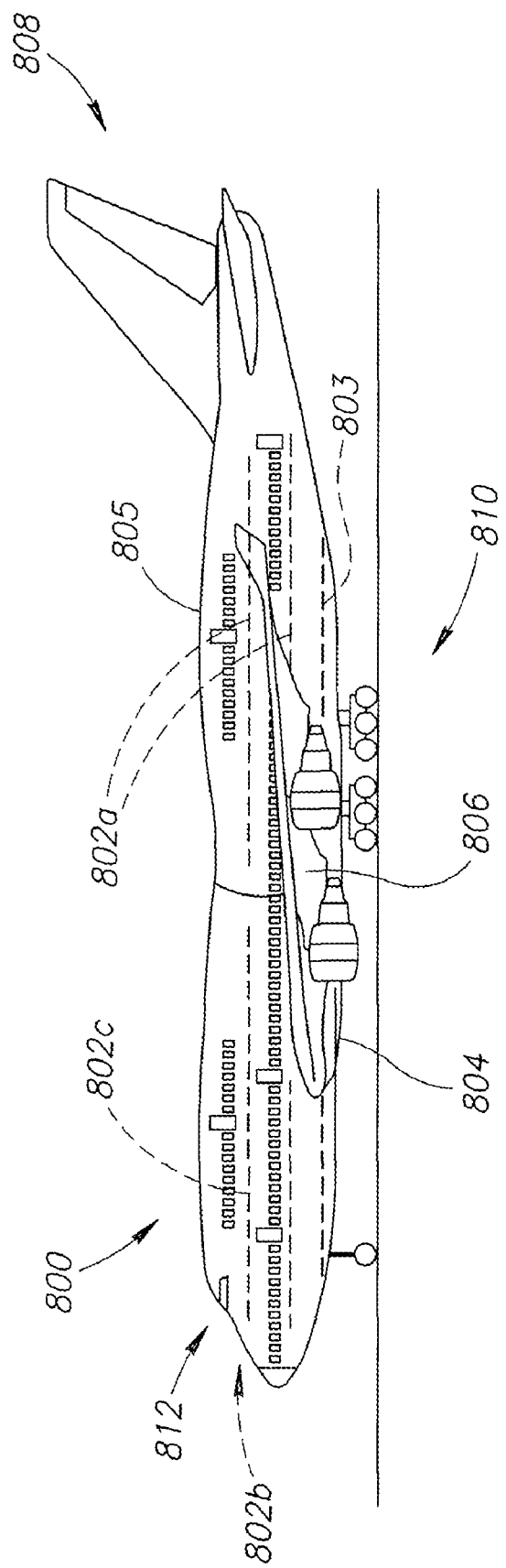
FIG. 10 is a side elevational view of an aircraft in accordance with another alternate embodiment of the invention.

FIG. 10 is a side elevational view of an aircraft 800 in accordance with another alternate embodiment of the present invention. In general, except for one or more floor assemblies 802 having non-protruding seat tracks in accordance with the present invention, the various components and subsystems of the aircraft 800 may be of known construction and, for the sake of brevity, will not be described in detail herein. Embodiments of floor assemblies 802 having non-protruding seat tracks in accordance with the present invention may be employed in one or more desired locations throughout the aircraft 800.

More specifically, as shown in FIG. 10, the aircraft 800 includes one or more propulsion units 804 coupled to an airframe 803 (not visible) disposed within a fuselage 805, wing assemblies 806 (or other lifting surfaces), a tail assembly 808, a landing assembly 810, a control system 812 (not visible), and a host of other systems and subsystems that enable proper operation of the aircraft 800. The floor assemblies having non-protruding seat tracks are distributed throughout the various portions of the aircraft 800, including, for example, within the cockpit (802b), the first-class section (802c), and the coach or business class section (802a).

Although the aircraft 800 shown in FIG. 6 is generally representative of a commercial passenger aircraft, including, for example, the 737, 747, 757, 767, 777, and 7E7 models commercially-available from The Boeing Company of Chicago, Ill., the inventive apparatus and methods disclosed herein may also be employed in virtually any other types of aircraft. More specifically, the teachings of the present invention may be applied to other types and models of passenger aircraft and military aircraft, and any other types of aircraft, including those described, for example, in The Illustrated Encyclopedia of Military Aircraft by Enzo Angelucci, published by Book Sales Publishers, September 2001, and in Jane's All the World's Aircraft published by Jane's Information Group of Coulsdon, Surrey, United Kingdom, which texts are incorporated herein by reference. Furthermore, alternate embodiments of apparatus and methods in accordance with the present invention may be used in the other applications, including, for example, ships, buses, trains, recreational vehicles, subways, monorails, houses, apartments, office buildings, or any other desired application.

While preferred and alternate embodiments of the invention have been illustrated and described, as noted above, many changes can be made without departing from the spirit and scope of the invention. Accordingly, the scope of the invention is not limited by the disclosure of the preferred and alternate embodiments. Instead, the invention should be determined entirely by reference to the claims that follow.

What is claimed is:

1. An aircraft, comprising a fuselage including a floor assembly, the floor assembly including a floor panel and an elongated support having a support surface engaged with a lower surface of the floor panel, the elongated support further having a component engagement surface being at least one of flush with and recessed below the lower surface of the floor panel so the floor panel covers the engagement and supports surfaces in a section where the elongated support is not being used to engage an aircraft component; wherein the engagement surface has an engagement slot disposed therein, the engagement slot having a plurality of alternating holes and lands and being adapted to cooperatively engage an aircraft component.

2. The aircraft of claim 1, further comprising an aircraft component, wherein the aircraft component includes a seat member.

3. The aircraft of claim 1, further comprising an aircraft component, wherein the aircraft component includes a partition.

4. The aircraft of claim 1, further comprising an aircraft component engaged with the engagement surface, wherein the aircraft component includes at least one of a passenger seat, a galley, a lavatory, a cargo container, a partition, a fireplace, a shelf, a bed, and an article of furniture.

5. The aircraft of claim 1, wherein the elongated support comprises: a first channel member having a first upper surface; a second channel member approximately parallel to and spaced apart from the first channel member, the second channel member having a second upper surface approximately co-planar with the first upper surface; and an engagement member coupled between the first and second channel members, the engagement member providing the engagement surface, the first and second upper surfaces providing the support surface, which is engaged with the lower surface of the floor panel.

6. The aircraft of claim 5, wherein the engagement member comprises a plate and the engagement surface has at least one of an engagement slot and an attachment aperture disposed therein.

7. The aircraft of claim 1, wherein the elongated support comprises: a raised plateau portion centrally disposed between a pair of outwardly-extending flange portions, the raised plateau portion including the engagement surface.

8. The aircraft of claim 1, wherein the elongated support comprises: a raised plateau portion centrally disposed between a pair of outwardly-extending flange portions; and a plate member extending coupled to the raised plateau portion, the top plate including the engagement surface.

9. The aircraft of claim 1, wherein the engagement surface is co-planar with at least one of the lower surface of the floor panel and the support surface.

10. The aircraft of claim 1, wherein the engagement surface is up to about 0.2 inches higher than the support surface.

11. The aircraft of claim 1, wherein the engagement surface is within a range of between about 0.20 inches higher than the support surface and about 0.04 inches lower than the support surface, inclusive.

12. An aircraft comprising a fuselage including a floor assembly and a plurality of payloads, the floor assembly including:
   a plurality of floor panels; and
   a plurality of elongated seat tracks underneath the floor panels, the seat tracks providing upper support surfaces for supporting the floor panels, the seat tracks also providing engagement surfaces for engaging the payloads, the engagement surfaces approximately co-planar with the support surfaces;
   wherein at least some floor panels extend unbroken over engagement surfaces of seat track portions that are not engaged with the payloads; and
   wherein at least some other floor panels have breaks that expose engagement surface of seat track portions that are engaged with payloads.

13. The aircraft of claim 12, wherein the payloads include passenger seats.

14. The aircraft of claim 12, wherein the payloads include partitions.

15. The aircraft of claim 12, wherein each engagement surface has at least one of an engagement slot and an attachment aperture disposed therein.

16. The aircraft of claim 12, wherein the engagement surfaces have engagement slots disposed therein, each engagement slot having a plurality of alternating holes and lands and being adapted to cooperatively engage a payload attachment assembly.

17. The aircraft of claim 12, wherein each seat track includes first and second channel members that are approximately parallel and spaced apart, and an engagement member coupled between the first and second channel members, wherein the channel members provide the upper support surfaces, and the engagement members provide the engagement surfaces.

18. The aircraft of claim 12, wherein each seat track includes a raised plateau portion centrally disposed between a pair of outwardly-extending flange portions, wherein the raised plateau portions provide the engagement surfaces.

19. The aircraft of claim 12, wherein the engagement surfaces are co-planar with at least one of the lower surfaces of the floor panels and the support surfaces.

20. The aircraft of claim 12, wherein the engagement surfaces are up to about 0.2 inches higher than the support surfaces.

* * * * *